Figure 1:
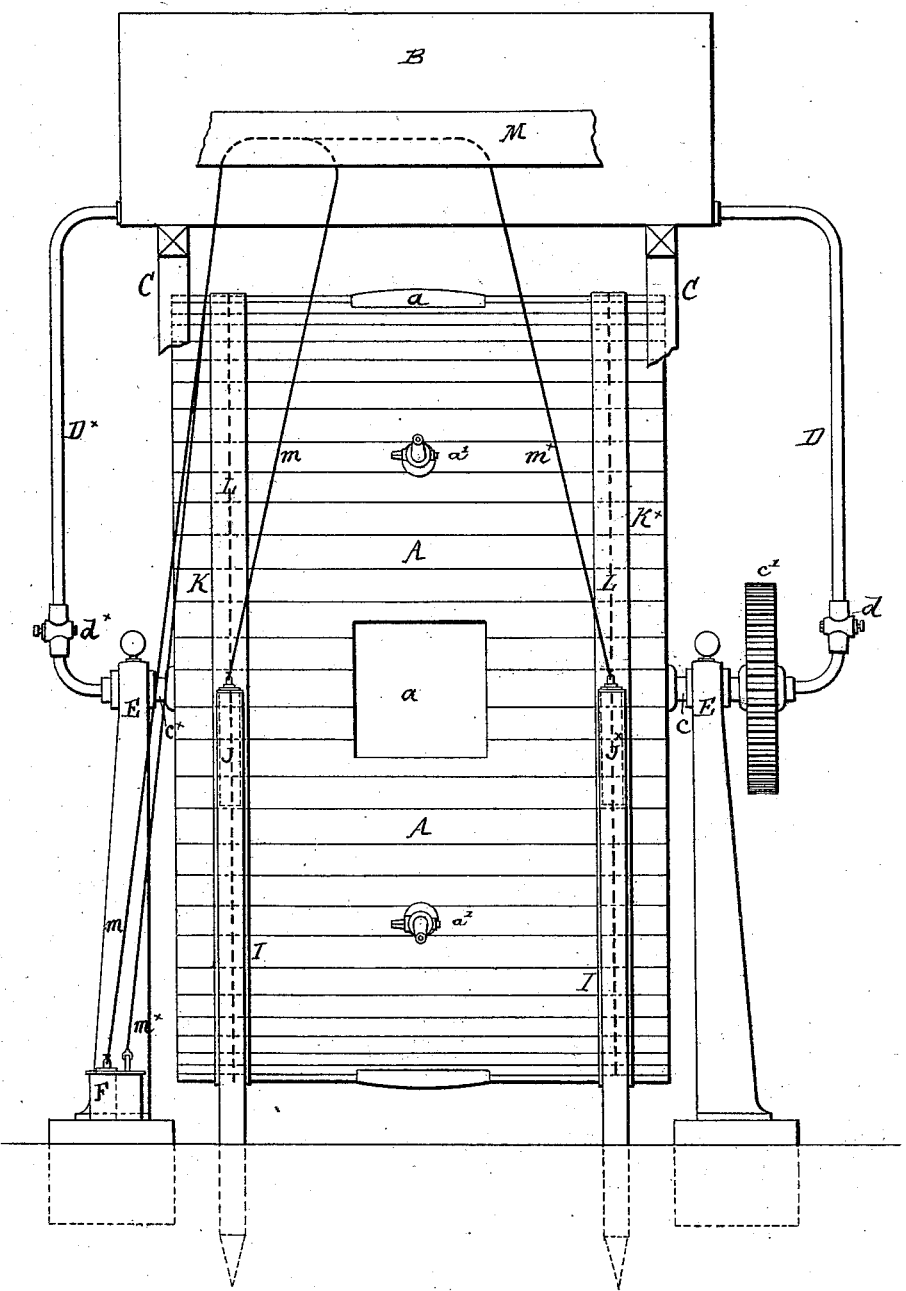

(No Model.) 2 Sheets—Sheet 1.

E. WORMS & J. BALÉ.
PROCESS OF AND APPARATUS FOR TANNING BY ELECTRICITY.

No. 361,249. Patented Apr. 12, 1887.

WITNESSES:
E. B. Bolton
J. O. Kaplinger

INVENTORS:
Eugène Worms
Jean Balé
By Henry Connett
Attorney

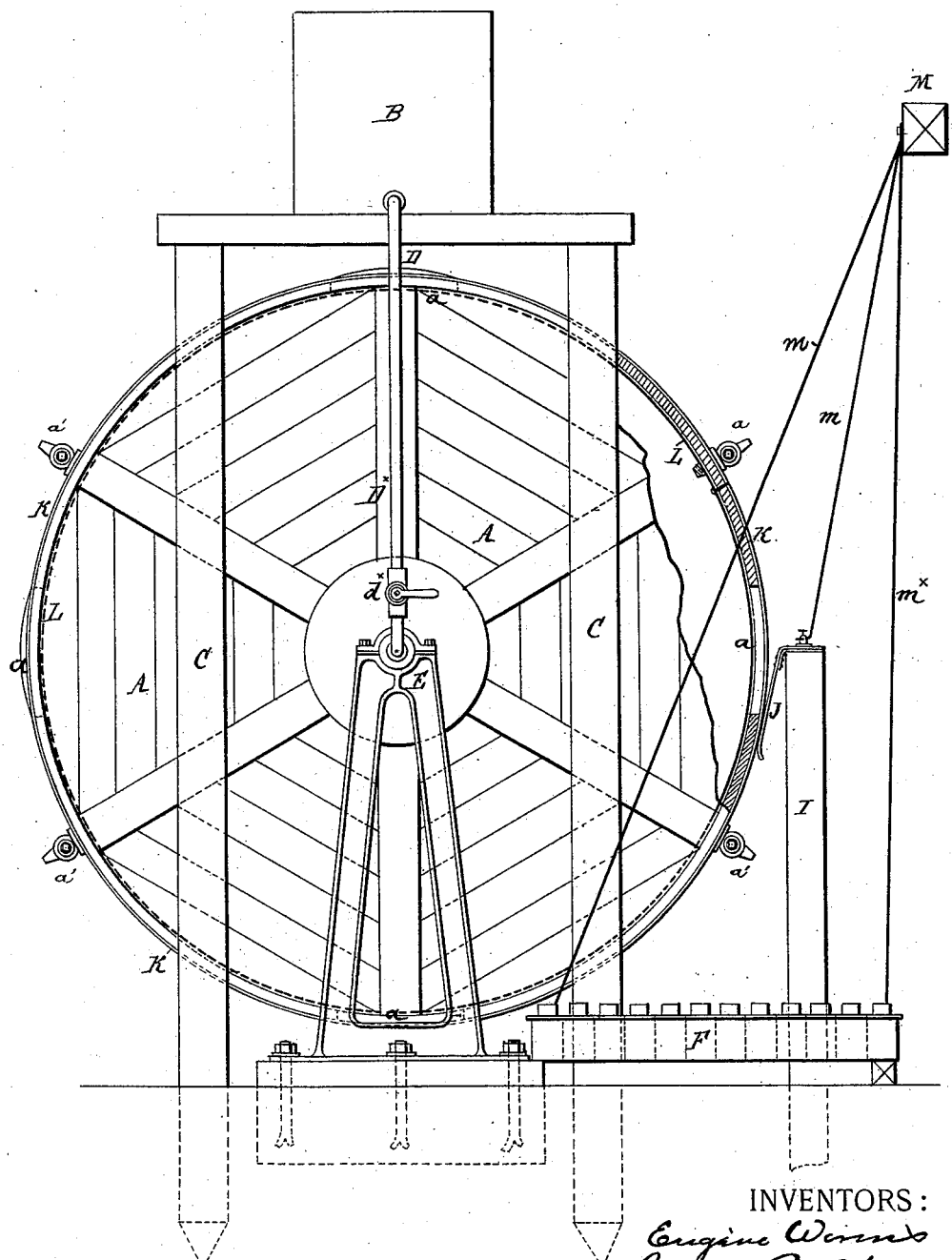

UNITED STATES PATENT OFFICE.

EUGÈNE WORMS AND JEAN BALÉ, OF PARIS, FRANCE.

PROCESS OF AND APPARATUS FOR TANNING BY ELECTRICITY.

SPECIFICATION forming part of Letters Patent No. 361,249, dated April 12, 1887.

Application filed January 7, 1887. Serial No. 223,650. (No model.) Patented in France December 14, 1886.

*To all whom it may concern:*

Be it known that we, EUGÈNE WORMS and JEAN BALÉ, both citizens of the French Republic, and residents of Paris, France, have jointly invented certain Improvements in Rapid Tanning and in Apparatus Therefor, of which the following is a specification.

This invention has been patented in France by patent dated December 14, 1886.

Our invention relates, in part, to a method of tanning hides and skins, and in part to an apparatus employed in carrying out said process; and our object is to tan the skins as well as it can be done by any of the old slow processes and to effect the result in a very short time, thereby effecting a desirable economy.

The use of electricity in tanning, in order to hasten the process, is already known. We employ electricity also as a part of our process; but we do not, of course, broadly claim it. Revolving drums have also been employed in tanning by the old methods. We employ a drum in carrying out our process; but we do not, of course, broadly claim the use of a drum in tanning.

We employ electricity in connection with a rotary drum in carrying out our new mode of tanning, and by this combination we are enabled to operate more rapidly than by any of the usual methods and to effect as good results as can be effected by any methods of tanning now known.

In the drawings, which serve to illustrate our improved tanning apparatus, Figure 1 is a front elevation of the apparatus, and Fig. 2 is a side elevation of the same. The drum in this latter view is partly broken away to show its construction.

A represents the drum, which may be made of wood. It has four man-holes, $a\ a$, provided with covers, so that the man-holes may be closed water-tight. This drum may have a capacity of about twelve thousand liters, and the man-holes may be about sixty centimeters square. The drum is armed on its interior surface with pegs about twenty-four centimeters long and eight centimeters thick placed about thirty centimeters between centers. Four cocks, $a'$, are provided for drainage, and these are arranged about midway between the man-holes. This drum is rotatively mounted in pillow-blocks E E on tubular axes $c\ c^\times$, on one of which is fixed the driving gear-wheel $c'$.

Above the drum is arranged a tank, B, capable of holding about four thousand liters. This tank is unequally divided interiorly by a partition, and is supported on a suitable frame, C, in such a way as not to interfere with the rotation of the drum. One end of tank B is connected with one of the tubular axes of the drum A by a pipe, D, provided with a cock, $d$, and the other end is connected with the other axis by a pipe, $D^\times$, provided with a cock, $d^\times$.

F is a galvanic battery of twelve elements, or it may be a magneto or dynamo electric machine. Wires or other conductors $m\ m^\times$ lead from the poles of the battery F to two metal springs, $J\ J^\times$, mounted on two posts or other insulating supports I in front of and adjacent to the drum A. These springs $J\ J^\times$ are kept pressed into electrical contact at all times with bands of metal $K\ K^\times$ on the exterior of the drum near its ends, said bands being by preference of copper. On the inside surface of the drum, under or opposite to the bands K, are arranged electrical conductors L, which extend entirely around the drum-periphery, and are connected electrically with the bands K. These conductors L are seen only in dotted lines in Fig. 1.

In order to get the wires $m\ m^\times$ up out of the way of the workmen, we usually carry them up and attach them to a beam, M, and then lead them thence down to the contact-springs J. Beam M may be any part of the roof or ceiling of the building in which the apparatus is arranged.

We have given proportions and dimensions suited to an apparatus of this character; but we do not wish to be limited to these.

Our method of tanning is as follows: We introduce into the drum A, first, five hundred and fifty liters of filtered water to each one hundred kilograms of green hides; second, five hundred grams tannin extract of 20° Baumé to each kilogram of green hides, and third, the quantity of green hides to be tanned, which should not, in an apparatus of this size, exceed five hundred kilograms. The man-hole is now closed and the drum set in motion at a velocity of nine to ten turns per minute. As soon as the rotation begins the electric circuit is closed (in the usual way) and the current traverses the drum from one conductor, L, to the other through the liquid therein. At the same time cock $d$ in pipe D is opened to admit to the drum from tank B a quantity of essence of terebinthine in the proportion of five liters of this essence to one hundred kilograms of green hides. The drum is now rotated for about twelve hours at the velocity given above, and at the termination of this period the electric current is interrupted. This is in the case where the hides being tanned are heavy. Where they are very light, the current is interrupted at the end of six hours. When the current of electricity has been interrupted, cock $d^x$ in pipe $D^x$ is opened (the drum still revolving) to admit to the drum the same quantity of tannin extract (from the other chamber of tank B) that was originally put into the drum—namely, five hundred grams at 20° Baumé for each kilogram of green hides. The rotation of the drum is continued for a period which will be governed by the kind of hides being tanned, as follows: eighty hours for beef hides, cow or bull skins; seventy-two hours for horse, kip, and heavy calf skins; forty-eight hours for medium or light calf-skins.

The tanning will be completed after the lapse of time given above, and the hides treated will have all the characteristics and qualities of hides treated by the old methods.

As soon as the rotation of the drum is finally arrested and the tanning completed the liquor is drawn off at the cock $a'$, which happens to be at the lowest point, into a hermetically-closed vessel.

One hour after drawing off the liquor two of the man-holes $a$, at the front and back of the drum and opposite to each other, are opened for ventilation, and in about two hours thereafter (the necessary evaporation having taken place) the tanned hides are removed and hung on poles to drain for a few hours. They are then delivered to the currier.

The tank B is, for convenience, constructed as described, the smaller compartment for the essence of terebinthine and the larger for the tannin extract. It is obvious, however, that these might be separate tanks or receptacles. They are arranged above the drums, so that their contents may flow into the drum by the action of gravity.

Having thus described our invention, we wish to say that the exact period required for tanning will vary somewhat with the weight and character of the skins treated, and we do not find it practicable to give the period required for all kinds. However, the experienced tanner will be able to work our process intelligently from the data herein given.

We claim—

1. The herein-described method of tanning, which consists in placing the tanning-liquid and green hides in a drum and imparting rotation thereto, and during said period of rotation or a part thereof sending a current of electricity through the liquid contents of the drum.

2. The herein-described method of tanning hides, which consists in placing in a receptacle capable of being rotated water, tannin extract, and green hides in substantially the proportions specified, then imparting rotary motion to said receptacle at about the velocity specified, then as soon as the rotary motion has begun passing a continuous current of electricity through the liquid contents of said receptacle, then, also as soon as rotary motion has begun, introducing into said receptacle essence of terebinthine in about the proportions specified, then after the lapse of time specified interrupting said current of electricity and introducing into said still rotating receptacle tannin extract in about the proportions specified, and then continuing the rotation of said receptacle until the tanning is effected, substantially as set forth.

3. The herein-described apparatus for tanning skins or hides, comprising a rotatively-mounted drum, A, provided with tubular axes and with two interiorly-arranged and two exteriorly-arranged electrical conductors, a generator of electricity, the poles of which are electrically connected, respectively, with said exteriorly-arranged conductors, and elevated tanks connected, respectively, with the two tubular axes of said drum A, substantially as set forth.

4. The combination of the rotatively-mounted drum A, having interiorly-arranged conductors L L and exteriorly-arranged conductors K $K^x$, in the nature of metal bands encircling said drum, said external and internal conductors being electrically connected in pairs, as described, a generator of electricity, F, metal contact-springs J $J^x$, in contact with the conductors K $K^x$, respectively, and conductors $m$ $m^x$, connecting the poles of the generator with said springs J $J^x$, substantially as set forth.

In witness whereof we have hereunto signed our names in the presence of two subscribing witnesses.

EUGÈNE WORMS.
JEAN BALÉ.

Witnesses:
 ROBT. M. HOOPER,
 AMAND RITTER.